US010052998B2

(12) United States Patent
Dudar

(10) Patent No.: US 10,052,998 B2
(45) Date of Patent: Aug. 21, 2018

(54) VEHICLE WITH HEADLIGHT SWEEP

(71) Applicant: Ford Global Technologies, LLC, Dearborn, MI (US)

(72) Inventor: Aed M. Dudar, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 42 days.

(21) Appl. No.: 15/210,822

(22) Filed: Jul. 14, 2016

(65) Prior Publication Data
US 2018/0015868 A1   Jan. 18, 2018

(51) Int. Cl.
*B60Q 1/076* (2006.01)
*B60Q 1/12* (2006.01)
*B60Q 1/16* (2006.01)
*B60Q 1/08* (2006.01)
*F21S 41/657* (2018.01)

(52) U.S. Cl.
CPC ............. *B60Q 1/085* (2013.01); *B60Q 1/076* (2013.01); *B60Q 1/12* (2013.01); *B60Q 1/16* (2013.01); *F21S 41/657* (2018.01); *B60Q 2300/05* (2013.01); *B60Q 2300/112* (2013.01); *B60Q 2300/122* (2013.01); *B60Q 2300/146* (2013.01); *B60Q 2300/42* (2013.01)

(58) Field of Classification Search
CPC .......... B60Q 1/085; B60Q 1/076; B60Q 1/12; B60Q 1/16
USPC ......................................................... 701/49
See application file for complete search history.

(56) References Cited

U.S. PATENT DOCUMENTS

| 7,241,035 | B2 | 7/2007 | Molto et al. | |
|---|---|---|---|---|
| 7,429,918 | B2 | 9/2008 | Watanabe | |
| 8,180,547 | B2 | 5/2012 | Prasad et al. | |
| 8,433,479 | B2 | 4/2013 | Lukacs et al. | |
| 2002/0057573 | A1* | 5/2002 | Kondo ................... | B60Q 1/115 362/465 |
| 2004/0114379 | A1* | 6/2004 | Miller .................... | B60Q 1/085 362/464 |
| 2004/0184279 | A1* | 9/2004 | Molto ..................... | B60Q 1/10 362/507 |

(Continued)

FOREIGN PATENT DOCUMENTS

| CN | 101365277 A | 2/2009 |
|---|---|---|
| EP | 2484557 A2 | 8/2012 |

(Continued)

OTHER PUBLICATIONS

Unpublished pending U.S. Appl. No. 14/991,496, filed Jan. 8, 2016 which is not being furnished herewith, pursuant to the Commissioner's Notice dated Sep. 21, 2004.

(Continued)

*Primary Examiner* — Yazan Soofi
(74) *Attorney, Agent, or Firm* — James P. Muraff; Neal, Gerber & Eisenberg LLP

(57) ABSTRACT

A vehicle includes: adaptive headlights, each configured to produce a continuous beam sweeping effect, processor(s) configured to: (a) detect failure of an adaptive headlight; (b) control the functional adaptive headlight to produce the continuous beam sweeping effect based on (a). The functional adaptive headlight achieves the continuous beam sweeping effect by (1) continuously cycling through a plurality of beam profiles, or (2) continuously rotating the headlights via motor(s).

20 Claims, 5 Drawing Sheets

(56) References Cited

U.S. PATENT DOCUMENTS

| | | | |
|---|---|---|---|
| 2005/0052879 A1* | 3/2005 | Bahnmuller | B60Q 1/12 |
| | | | 362/465 |
| 2012/0001547 A1 | 1/2012 | Nishitani | |
| 2012/0074842 A1* | 3/2012 | Hattori | B60Q 1/1423 |
| | | | 315/77 |
| 2017/0016588 A1* | 1/2017 | Saito | G02B 26/105 |

FOREIGN PATENT DOCUMENTS

| | | |
|---|---|---|
| EP | 2279908 B1 | 4/2016 |
| JP | 2005088630 A | 4/2005 |
| WO | WO 2016020338 A1 | 2/2016 |

OTHER PUBLICATIONS

Search Report dated Jan. 9, 2018, for GB Patent Application No. GB 1711167.5 (3 pages).

* cited by examiner

VEHICLE WITH HEADLIGHT SWEEP

TECHNICAL FIELD

This disclosure relates to vehicle headlights.

BACKGROUND

Vehicles typically include two headlights (a left headlight and a right headlight). These headlights occasionally fail, leaving the vehicle with a single functional headlight. Vehicles with only a single functional headlight may confuse other drivers. More specifically, the other drivers may incorrectly assume that the vehicle is a motorcycle as opposed to an SUV or a sedan.

SUMMARY

A vehicle consistent with the present disclosure includes: adaptive headlights, each configured to produce a continuous beam sweeping effect, processor(s) configured to: (a) detect failure of an adaptive headlight; (b) control the functional adaptive headlight to produce the continuous beam sweeping effect based on (a). The functional adaptive headlight achieves the continuous beam sweeping effect by (1) continuously cycling through a plurality of beam profiles, or (2) continuously rotating the headlights via motor(s).

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
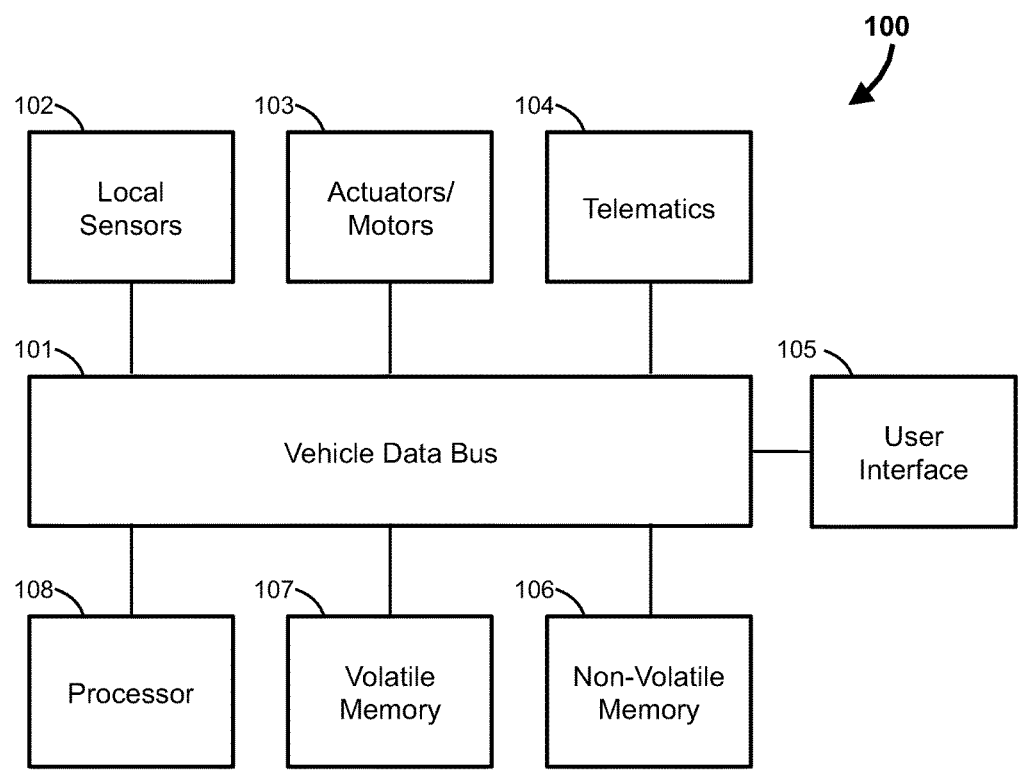
FIG. 1 is a block diagram of a vehicle computing system.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present, as one option, and mutually exclusive alternatives as another option. In other words, the conjunction "or" should be understood to include "and/or" as one option and "either/or" as another option.

FIG. 1 shows a computing system 100 of an example vehicle 200. The vehicle 200 is also referred to as a first vehicle 200. The vehicle 200 includes a motor, a battery, at least one wheel driven by the motor, and a steering system configured to turn the at least one wheel about an axis. Suitable vehicles are also described, for example, in U.S. patent application Ser. No. 14/991,496 to Miller et al. ("Miller") and U.S. Pat. No. 8,180,547 to Prasad et al. ("Prasad"), both of which are hereby incorporated by reference in their entireties. The computing system 100 enables automatic control of mechanical systems within the device. It also enables communication with external devices. The computing system 100 includes a data bus 101, one or more processors 108, volatile memory 107, non-volatile memory 106, user interfaces 105, a telematics unit 104, actuators and motors 103, and local sensors 102.

The data bus 101 traffics electronic signals or data between the electronic components. The processor 108 performs operations on the electronic signals or data to produce modified electronic signals or data. The volatile memory 107 stores data for immediate recall by the processor 108. The non-volatile memory 106 stores data for recall to the volatile memory 107 and/or the processor 108. The non-volatile memory 106 includes a range of non-volatile memories including hard drives, SSDs, DVDs, Blu-Rays, etc. The user interface 105 includes displays, touch-screen displays, keyboards, buttons, and other devices that enable user interaction with the computing system. The telematics unit 104 enables both wired and wireless communication with external processors via Bluetooth, cellular data (e.g., 3G, LTE), USB, etc. The telematics unit 104 may be configured to broadcast signals at a certain frequency.

The actuators/motors 103 produce physical results. Examples of actuators/motors include fuel injectors, steering, a motor for transmitting torque to wheels, windshield wipers, brake light circuits, headlight circuits, transmissions, airbags, haptic motors or engines etc. The local sensors 102 transmit digital readings or measurements to the processor 108. Examples of suitable sensors include temperature sensors, rotation sensors, seatbelt sensors, speed sensors, cameras, lidar sensors, radar sensors, ultrasonic sensors, infrared sensors, etc. It should be appreciated that the various connected components of FIG. 1 may include separate or dedicated processors and memory. Further detail of the structure and operations of the computing system 100 is described, for example, in Miller and/or Prasad.

Figure 2:
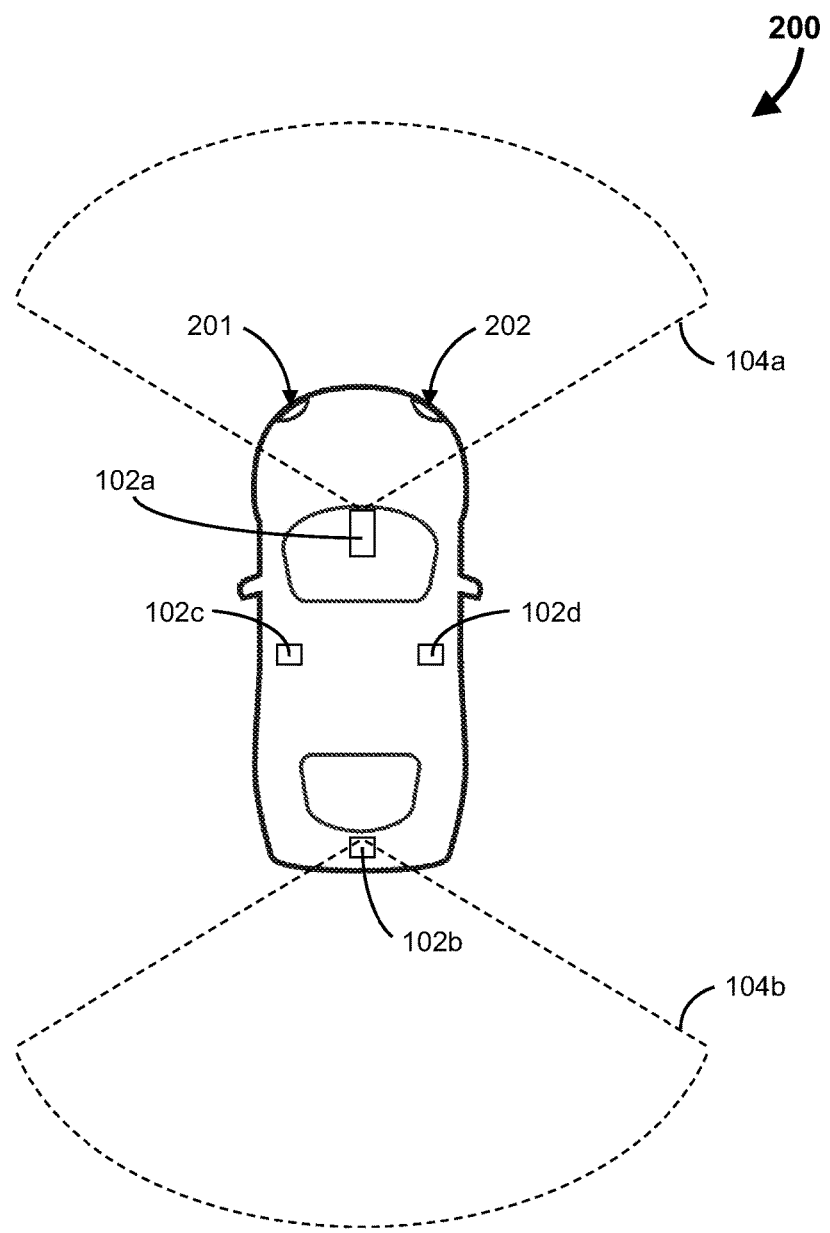
FIG. 2 is a schematic of a vehicle including the vehicle computing system.

FIG. 2 generally shows and illustrates the vehicle 200, which includes the computing system 100. Although not shown, the vehicle 200 is in operative wireless communication with a nomadic device, such as a mobile phone. Some of the local sensors 102 are mounted on the exterior of the vehicle 200. Local sensor 102a may be an ultrasonic sensor, a lidar sensor, a camera, a video camera, and/or a microphone, etc. Local sensor 102a may be configured to detect objects leading the vehicle 200 as indicated by leading sensing range 104a. Local sensor 102b may include one or more of an ultrasonic sensor, a lidar sensor, an infrared sensor, a camera, a video camera, and/or a microphone, etc. Local sensor 102b may be configured to detect objects trailing the vehicle 200 as indicated by trailing sensing range 104b. Left sensor 102c and right sensor 102d may be configured to perform the same functions for the left and right sides of the vehicle 200. The vehicle 200 includes a host of other sensors 102 located in the vehicle interior or on the vehicle exterior. These sensors may include any or all of the sensors disclosed in Prasad.

It should be appreciated that the vehicle 200 is configured to perform the methods and operations described below. In some cases, the vehicle 200 is configured to perform these functions via computer programs stored on the volatile and/or non-volatile memories of the computing system 100. A processor is "configured to" perform a disclosed operation when the processor is in operative communication with memory storing a software program with code or instructions embodying the disclosed operation. Further description of how the processor, memories, and programs cooperate appears in Prasad. It should be appreciated that the nomadic device and/or an external server in operative communication with the vehicle 200 perform some or all of the methods and operations discussed below.

According to various embodiments, the vehicle 200 is the vehicle 100*a* of Prasad. According to various embodiments, the computing system 100 is the VCCS 102 of FIG. 2 of Prasad. According to various embodiments, the vehicle 200 is in communication with some or all of the devices shown in FIG. 1 of Prasad, including the nomadic device 110, the communication tower 116, the telecom network 118, the Internet 120, and the data processing center 122.

The term "loaded vehicle," when used in the claims, is hereby defined to mean: "a vehicle including: a motor, a plurality of wheels, a power source, and a steering system; wherein the motor transmits torque to at least one of the plurality of wheels, thereby driving the at least one of the plurality of wheels; wherein the power source supplies energy to the motor; and wherein the steering system is configured to steer at least one of the plurality of wheels." The term "equipped electric vehicle," when used in the claims, is hereby defined to mean "a vehicle including: a battery, a plurality of wheels, a motor, a steering system; wherein the motor transmits torque to at least one of the plurality of wheels, thereby driving the at least one of the plurality of wheels; wherein the battery is rechargeable and is configured to supply electric energy to the motor, thereby driving the motor; and wherein the steering system is configured to steer at least one of the plurality of wheels."

Figure 3:
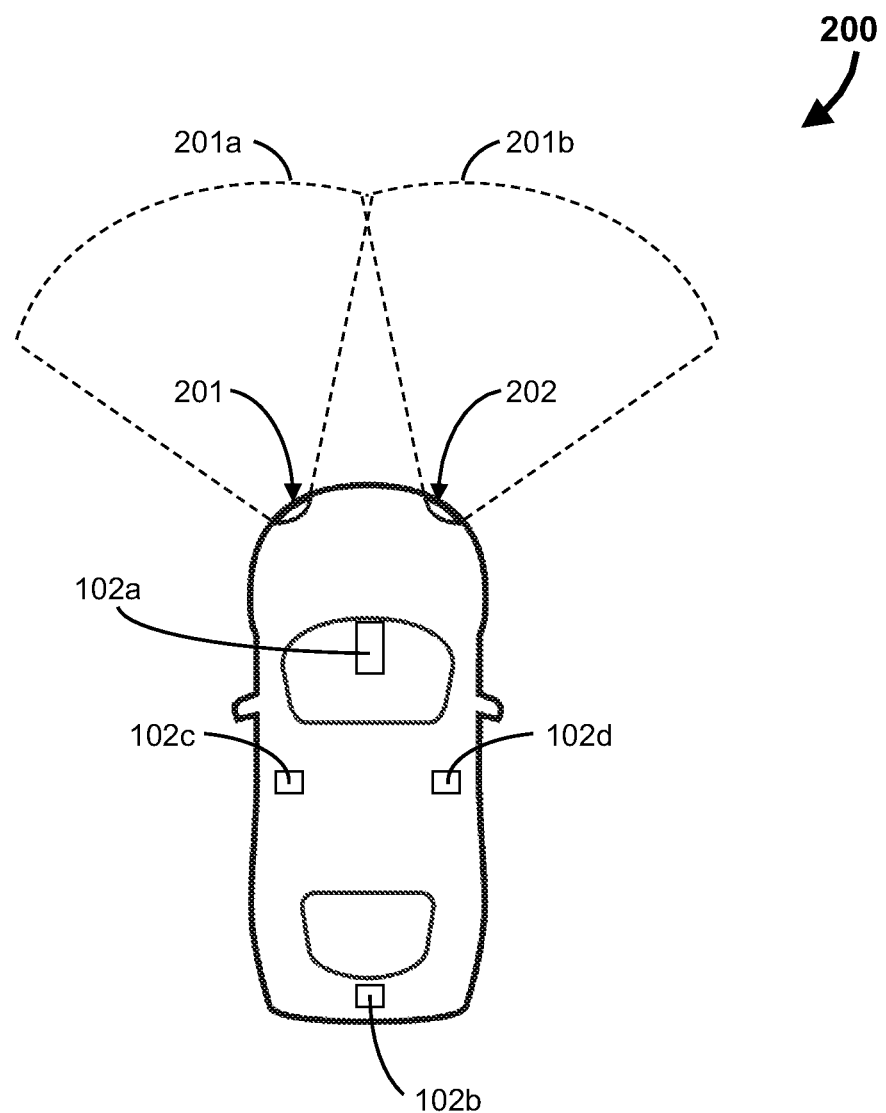
FIG. 3 is a schematic of the vehicle.

As shown in FIGS. 2 and 3, the vehicle 200 includes a left headlight 201 and a right headlight 202. The headlights 201, 202 are adaptive, meaning that the headlights 201, 202 are configured to project a beam of light having a profile based on a steering angle and/or velocity of the vehicle 200. According to various embodiments, the headlights 201, 202 have the structure of the headlamp system 10 described in U.S. Pat. No. 8,433,479 to Lukacs et al. ("Lukacs"), which is hereby incorporated by reference in its entirety More specifically, one of the headlights 201, 202 may have the configuration shown in FIG. 1 of Lukacs. The other headlight 202, 201 may have a mirror of the configuration shown in FIG. 1 of Lukacs. According to various embodiments, the vehicle 200 is configured to control the headlights 201, 202 via some or all of the functions and operations described in Lukacs and thus the vehicle 200 of the present invention may share some or all of the features of the vehicle described in Lukacs.

As shown in FIG. 1 of Lukacs, the headlights 201, 202 of the present invention may each include a main light source and a plurality of supplementary light sources. As shown in FIG. 2 of Lukacs, the vehicle 200 of the present invention adjusts beam profile of the headlights by activating, deactivating, and/or adjusting the supplementary light sources. As shown in FIG. 3 of Lukacs, the vehicle 200 of the present invention adjusts the beam profile based on a steering angle and vehicle speed (when adaptive steering is active). Alternatively or in addition to the supplementary light sources, the vehicle 200 may be configured to rotate the main light source about a vertical axis (similar to a lighthouse). A motor drives the rotation of the primary light source. The vehicle controls the motor based on the steering angle and the vehicle speed (when adaptive steering is active).

It should thus be appreciated that the vehicle 200 is equipped to manipulate beam profile via least one of two possible headlight configurations: (a) by activating, deactivating, and/or adjusting supplemental headlights; (b) by rotating the main headlight about a vertically extending axis.

The discussion that follows relates to controlling the beam profile emanating from one of the headlights back and forth to simulate a swiveling headlight. This is referred to as a sweeping effect. When the vehicle 200 is equipped with configuration (b), the vehicle 200 commands the motor to swivel the headlight back and forth around the vertical axis and thus achieves a sweeping effect. When the vehicle 200 is equipped with configuration (a), the vehicle 200 may simulate a swiveling motion (and thus achieve the sweeping effect) by cycling forwards and backwards through a series of predetermined beam profiles (each beam profile being associated with a main headlight power level and a supplemental headlight power level for each of the supplemental headlights).

For example, the vehicle 200 may achieve beam profile (1) by activating the main headlight and none of the supplemental headlights to generate a beam profile that extends generally parallel with straight road. The vehicle 200 may achieve beam profile (2) by activating the main headlight and some of the supplemental headlights to generate a beam profile that extends at a 5 degree angle with respect to generally straight road. The vehicle 200 may achieve beam profile (3) by activating the main headlight and all of the supplemental headlights to generate a beam profile that extends at a 10 degree angle with respect to generally straight road.

Figure 5:
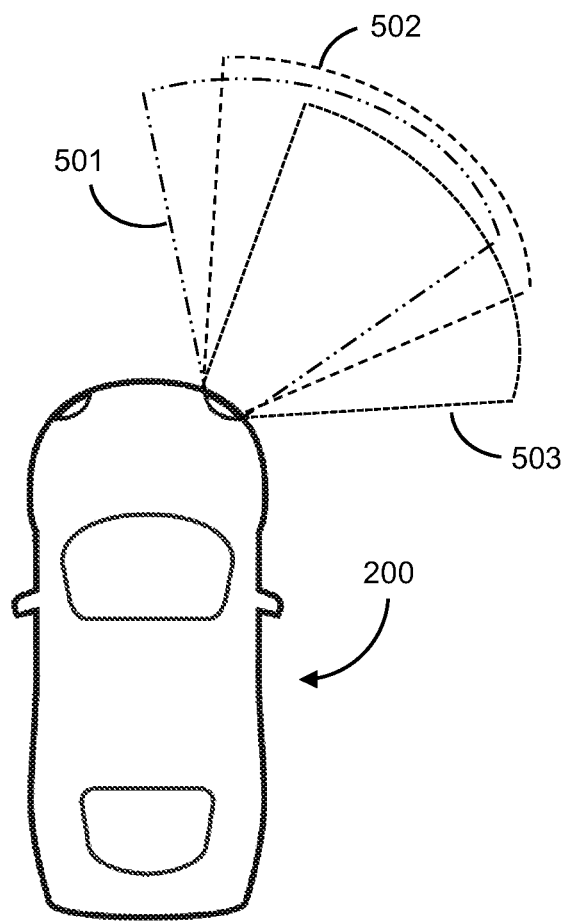
FIG. 5 shows various beam profiles.

FIG. 5 generally shows and illustrates three beam profiles. The vehicle 200 cycles between a first beam profile 501, a second beam profile 502, and a third beam profile 503. The first beam profile 501 is parallel with the road. The second beam profile is at an angle X with respect to the road. The third beam profile is at an angle 2*X with respect to the road. The first beam profile 501 may be beam profile (1), the second beam profile 502 may be beam profile (2), and the third beam profile 503 may be beam profile (3).

Figure 4:
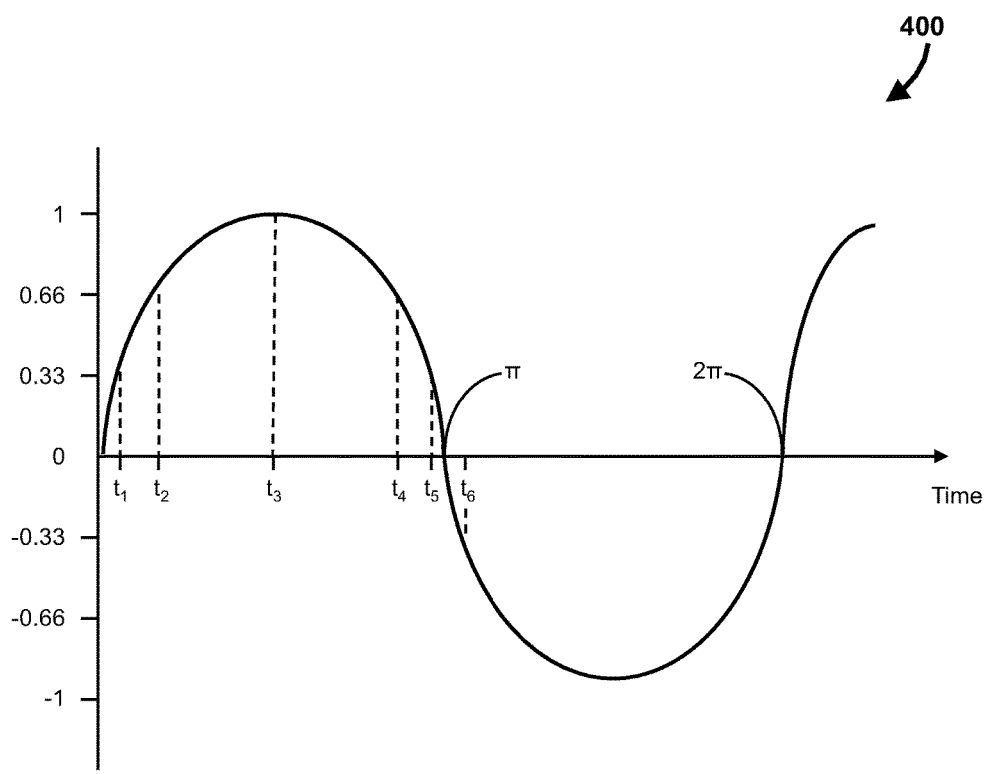
FIG. 4 is a graph of a sinusoidal curve that relates times to beam profiles.

When the vehicle 200 is equipped with configuration (b), the vehicle 200 simulates a headlight swiveling motion (i.e., generates the sweeping effect) by cycling through the beam profiles according to the following array: [beam profile (1), beam profile (2), beam profile (3), beam profile (2), beam profile (1), beam profile (2), beam profile (3), etc.] With additional beam profiles (e.g., 20 beam profiles), the vehicle 200 can provide a more authentic simulation. FIG. 4, discussed in detail below, illustrates the array cycling process.

The above disclosure refers to the angle of the beam profiles. Beam profiles are typically complicated and do not observe simple geometric relationships. See, for example, FIGS. 3 to 7 of U.S. Patent Publication No. 2004/0114379 to Miller et al. ("Miller-2"), which is hereby incorporated by reference in its entirety. It should thus be appreciated that the angle of the beam profiles may correspond steering angles that would, under normal adaptive headlight circumstances, produce the beam profile. For example, when a driver steers 5 degrees to the left at velocity X, the vehicle 200 implements a beam profile corresponding to a steering angle of 5 degrees. When the driver steers 10 degrees to the left at velocity X, the vehicle 200 implements a beam profile corresponding to a steering angle of 10 degrees. These relationships are disclosed, for example, in Lukacs and Miller-2. Thus, with reference to FIG. 5, the first beam profile 501 may correspond to beam profile associated, during adaptive steering, with a steering angle of 0 to 10 degrees to the right. The second beam profile 502 may correspond to a beam profile associated, during adaptive steering, with a steering angle of 10 to 20 degrees to the right. The third beam profile 503 may correspond to a beam profile, associated, during adaptive steering, with a steering angle of 20 to 30 degrees to the right.

It should thus be appreciated that headlights achieve the sweeping effect via configuration (a) by cycling through the profiles as described above to simulate a swiveling headlight and via configuration (b) by physically swiveling the headlights via the headlight motors.

As previously discussed, the vehicle 200 includes two headlights 201, 202. One of these headlights (e.g., the left headlight 201) may fail due to a range of circumstances: the headlight wiring may become damaged, the headlight may burn out, etc. In such a circumstance and as previously discussed, only a single headlight (e.g., the right headlight 202) will remain functional. This may pose a safety hazard as oncoming traffic, especially at night, may assume that the vehicle 200 is a motorcycle or a bicycle as opposed to a sedan, a truck, or an SUV.

The present disclosure applies the sweeping effect to alert incoming traffic that the vehicle 200 is not a motorcycle or bicycle, but instead a sedan or SUV that includes two distinct headlights. The sweeping effect may also convey a velocity or acceleration of the vehicle 200 to oncoming traffic and disperse animals such as deer. Accordingly, the vehicle 200 is configured to (a) detect when one of the headlights has failed and (b) produce the sweeping effect.

The vehicle 200 detects headlight failure based on one or more of: (a) measured current and/or voltage to the headlight, (b) corresponding user input, (c) data recorded by the leading local vehicle sensor 102a (e.g., images taken by the local vehicle sensor 102a are unusually dark and/or fail to show a headlight beam).

Upon failure detection of one of the headlights 201, 202, the vehicle 200 automatically engages the sweeping effect. When equipped with configuration (a), the vehicle 200 begins cycling through the array of predetermined beam profiles. When equipped with configuration (b), the vehicle 200 begins rotating or swiveling the functional (i.e., remaining) headlight via the motor.

For both configurations (a) and (b), the vehicle 200 selects a sweeping range. The sweeping range is the angle defined by the difference between the beam profile of the array angled to the extreme left and the beam profile of the array angled to the extreme right (as previously discussed, if the vehicle is equipped with configuration (b), then the angle of the beam profile may correspond to the steering angle normally associated with the beam profile). The vehicle 200 is configured to select a sweeping range based on various inputs. For example, the vehicle 200 may select a sweeping range of 10 degrees according to one set of inputs and a sweeping range of 20 degrees according to another set of inputs.

According to various embodiments, the vehicle 200 generates a sweeping effect that simulates a sinusoidal curve. At a position of +1 along the Y axis, the beam profile is at the extreme left of the selected sweeping range. At a position of −1 along the Y axis, the beam profile is at the extreme right of the selected sweeping range. The X axis represents time. To produce a sinusoidal effect, the vehicle 200 cycles between headlight profiles according to the sinusoidal curve. When the vehicle is equipped with configuration (a), each headlight profile may be associated with a specific Y axis range (e.g., profile A is 0 to 0.1, profile B is 0.1 to 0.2, etc.). Thus, the vehicle 200 switches from profile A to profile B at the time along the X axis corresponding to a Y axis position of 0.1. Put differently, the vehicle 200 segments the Y axis of the sinusoidal curve and associates a beam profile with each segment.

FIG. 4 shows an example sinusoidal curve 400. Beam profile 1 is associated with a Y axis range of 0 to 0.33. Beam profile 2 is associated with a Y axis range of 0.33 to 0.66. Beam profile 3 is associated with a Y axis range of 0.66 to 1. Beam profile 4 is associated with a Y axis range of 0 to −0.33. Beam profile 5 is associated with a Y axis range of −0.33 to −0.66. Beam profile 6 is associated with a Y axis range of −0.66 to −1.0. Beam profile 1 is at a 3 degree angle with respect to the horizontal (i.e., straight road). Beam profile 2 is at a 6 degree angle with respect to the horizontal. Beam profile 3 is at a 9 degree angle; beam profile 4 is at a −3 degree angle; beam profile 5 is at a −6 degree angle; beam profile 6 is at a −9 degree angle.

When the vehicle 200 activates the headlight sweep, the vehicle 200 applies beam profile 1 until $t_1$. The vehicle 200 applies beam profile 2 from $t_1$ to $t_2$. The vehicle applies beam profile 3 from $t_2$ to $t_4$. The vehicle applies beam profile 2 from $t_4$ to $t_5$. The vehicle applies beam profile 1 from $t_5$ to pi. The vehicle applies beam profile 4 from pi to $t_6$, etc.

When the vehicle is equipped with configuration (b), the vehicle 200 controls the acceleration and/or velocity of the headlight motor to produce the sinusoidal effect. With reference to FIG. 4, the vehicle 200 controls the headlight motor such that the headlight is at an angle=⅓ (or 0.33) of the extreme right angle at $t_1$, at an angle=⅔ (or 0.66) of the extreme right angle at $t_2$, at the extreme right angle at $t_3$, etc. One may find the appropriate acceleration and/or velocities by taking derivatives of the sinusoidal curve of Figure Z.

It should be appreciated that the values of FIG. 4 are purely exemplary and are only shown for illustration. In practice, the frequency of the sinusoidal curve may be adjusted and, under configuration (a), more or fewer beam profiles may be associated with the curve (i.e., the Y axis may be segmented into more than 6 different beam profiles).

According to various embodiments, the vehicle 200 selects the sweeping range and/or the frequency of the sinusoidal curve based on one or more of (a) detected speed of the vehicle 200, (b) detected acceleration of the vehicle 200, and (c) dimensions of the vehicle 200, (d) distance of a detected object from the vehicle 200, (e) distance of a detected oncoming vehicle from the vehicle 200, (f) whether the vehicle 200 is being manually driven or autonomously driven.

For example, when the vehicle 200 is traveling at a high rate of speed, the vehicle 200 may implement a narrow sweeping range with a high sinusoidal frequency. When the vehicle 200 is traveling at a low rate of speed, the vehicle 200 may implement a wide sweeping range with a low sinusoidal frequency. With respect to point (f), when the vehicle 200 is being manually driven the sweeping range may be narrower than when the vehicle is being autonomously driven. Thus, with respect to point (f), the vehicle 200 narrows the sweeping range when detecting manual drive and broadens the sweeping range when detecting autonomous drive.

As described above, the vehicle 200 automatically performs the sweeping upon detecting headlight failure. According to various embodiments, the vehicle 200 only automatically performs the sweeping upon detecting (a) incoming traffic (i.e., other incoming vehicles) and/or (b) objects of a predetermined size leading the vehicle (e.g., animals). As is known in the art, the vehicle 200 may make these determinations via the leading local sensor 102*b*.

According to various embodiments, the vehicle 200 temporarily deactivates the sweeping upon detecting cornering of the vehicle 200. More specifically, when the velocity of the vehicle is below a predetermined cornering velocity (e.g., 20 mph) and the steering angle exceeds a certain magnitude (e.g., 10 degrees from center), the vehicle 200 may deactivate the sweeping and set the headlight profile of the functional headlight to one or more predetermined cornering profiles. When the cornering maneuver has ended (as detected with reference to speed and/or steering angle), the vehicle 200 reactivates the sweeping.

The sweeping effect advantageously disperses animals such as deer. It should thus be appreciated that the vehicle 200 may perform the sweeping effect, even when both headlights are functional. The vehicle 200 may perform the sweep in response to: (a) a user command, (b) automatically in response to detecting animals fitting a predetermined profile, (c) automatically in response to GPS location. With respect to (c), the vehicle 200 may query a map stored on an external server of known deer locations and automatically perform the sweep when the vehicle has entered one of the deer locations. When both headlights sweep, the headlights may be in phase or 180 degrees out of phase.

Although the invention has been applied to headlights, as discussed above, it should be appreciated that the invention may apply to other sources of light, such as rear vehicle lights (or any other light source). Vehicles typically include at least two kinds of rear lights: brake lights, which activate when the vehicle brakes, and tail lights, which activate simultaneously with the headlights (i.e., the tail lights are intended to be always active when the vehicle is driving at night).

The tail lights may have a configuration similar to the headlamp system 10 of Lukacs. More specifically, the tail lights may include a main light and a plurality of supplementary lights. The tail lights may optically communicate information about the vehicle 200 to trailing vehicles. For example, the vehicle 200 may be configured to sweep the tail lights (using the above-disclosed methods) at a certain frequency and with a certain sweeping range based on one or more of (a) velocity of the vehicle 200, (b) acceleration of the vehicle 200, (c) deceleration of the vehicle 200.

The invention claimed is:

1. A vehicle comprising:
   first and second adaptive headlights each configured to produce a continuous beam sweeping effect, and processor(s) configured to:
   (a) detect failure of the first adaptive headlight; and
   (b) control the second adaptive headlight to produce the continuous beam sweeping effect in response to detecting the failure of the first adaptive headlight.

2. The vehicle of claim 1, wherein the second adaptive headlight achieves the continuous beam sweeping effect by (a) continuously cycling through a plurality of beam profiles, or (b) continuously rotating the headlights via motor(s).

3. The vehicle of claim 1, wherein the processor(s) are configured to:
   control the second adaptive headlight to produce the continuous beam sweeping effect with reference to a sinusoidal curve.

4. The vehicle of claim 3, wherein the sinusoidal curve relates a plurality of times to a plurality of beam profiles.

5. The vehicle of claim 1, wherein the processor(s) are configured to:
   (c) detect incoming traffic via local sensor(s); and
   (b) control the second adaptive headlight to produce the continuous beam sweeping effect based on (a) and (c).

6. The vehicle of claim 2, wherein the processor(s) are configured to:
   continuously cycle through the plurality of beam profiles according to a sinusoidal curve; and
   the sinusoidal curve having a time X axis and a Y axis segmented according to the plurality of beam profiles.

7. The vehicle of claim 1, wherein the processor(s) are configured to:
   control the adaptive headlights to produce the continuous beam sweeping effects based on a detected GPS location of the vehicle.

8. The vehicle of claim 3, wherein the processor(s) are configured to:
   adjust a frequency of the sinusoidal curve based on a detected vehicle velocity or a detected vehicle acceleration.

9. The vehicle of claim 1, wherein the processor(s) are configured to:
   detect a cornering maneuver based on steering angle; and
   disable the continuous beam sweeping effect during the cornering maneuver.

10. The vehicle of claim 1, wherein the processor(s) are configured to:
    (c) select a beam sweeping range based on vehicle velocity; and
    (b) control the second adaptive headlight to produce the continuous beam sweeping effect based on (a) and (c).

11. A method comprising, via processor(s) of a vehicle having adaptive headlights each configured to produce a continuous beam sweeping effect:
    (a) detecting failure of an adaptive headlight;
    (b) controlling a functional adaptive headlight to produce the continuous beam sweeping effect based on (a).

12. The method of claim 11, wherein the functional adaptive headlight achieves the continuous beam sweeping effect by (a) continuously cycling through a plurality of beam profiles, or (b) continuously rotating the headlights via motor(s).

13. The method of claim 11, comprising:
    controlling the functional adaptive headlight to produce the continuous beam sweeping effect with reference to a sinusoidal curve.

14. The method of claim 13, wherein the sinusoidal curve relates a plurality of times to a plurality of beam profiles.

15. The method of claim 11, comprising:
    (c) detecting incoming traffic via local sensor(s); and
    (b) controlling the functional adaptive headlight to produce the continuous beam sweeping effect based on (a) and (c).

16. The method of claim 12, comprising:
    continuously cycling through the plurality of beam profiles according to a sinusoidal curve; and
    the sinusoidal curve having a time X axis and a Y axis segmented according to the plurality of beam profiles.

17. The method of claim 11, comprising:
controlling both adaptive headlights to produce the continuous beam sweeping effects based on a detected GPS location of the vehicle.

18. The method of claim 13, comprising:
adjusting a frequency of the sinusoidal curve based on a detected vehicle velocity or a detected vehicle acceleration.

19. The method of claim 11, comprising:
detecting a cornering maneuver based on steering angle; and
disabling the continuous beam sweeping effect during the cornering maneuver.

20. The method of claim 11, comprising:
(c) selecting a beam sweeping range based on vehicle velocity; and
(b) controlling the functional adaptive headlight to produce the continuous beam sweeping effect based on (a) and (c).

* * * * *